April 18, 1939. D. ERICKSON Re. 21,049

ROD LINE IDLER

Original Filed July 2, 1935

INVENTOR.
David Erickson
BY
Van Buren Hillyard.
ATTORNEY.

Reissued Apr. 18, 1939

Re. 21,049

UNITED STATES PATENT OFFICE 21,049

ROD LINE IDLER

David Erickson, Wichita Falls, Tex.

Original No. 2,044,526, dated June 16, 1936, Serial No. 29,549, July 2, 1935. Application for reissue June 16, 1937, Serial No. 148,613

9 Claims. (Cl. 308—7)

The invention provides novel and unique support and guide means for a reciprocating power rod line transmission, such as used in oil fields for operating a number of pumps from a given source of power.

The invention provides a device of simple, sturdy and durable structure, involving few parts and not susceptible of disarrangement when properly installed, or to the collection of moisture, sand or other foreign matter tending to detract from its efficiency or shorten its period of service.

While the drawing illustrates a preferred embodiment of the invention, it is to be understood that in adapting the same to meet specific needs and requirements, the design may be varied, and changes in the minor details of construction may be resorted to within the scope of the invention as claimed, without departing from the spirit thereof.

For a full understanding of the invention and the merits thereof, reference is to be had to the following description and the drawing hereto attached, in which.

Corresponding and like parts are referred to in the following description and designated in the several views of the drawing by like reference characters.

Figure 1:
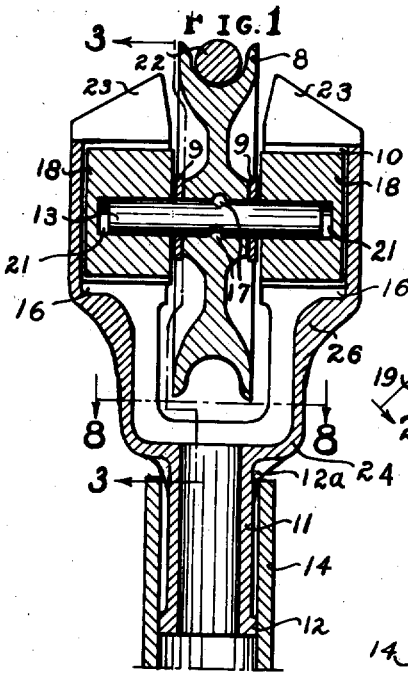
Fig. 1 is a vertical, central sectional view illustrative of an embodiment of the invention.
Figure 2:
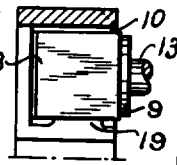
Fig. 2 is a sectional detail on the line 2—2 of Fig. 3.
Figure 3:
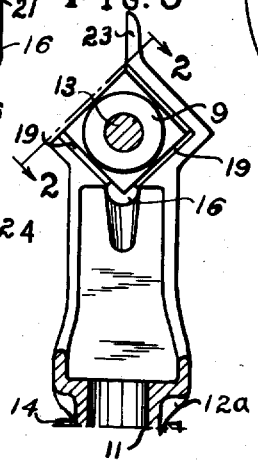
Fig. 3 is a vertical detail section on the line 3—3 of Fig. 1.
Figure 4:
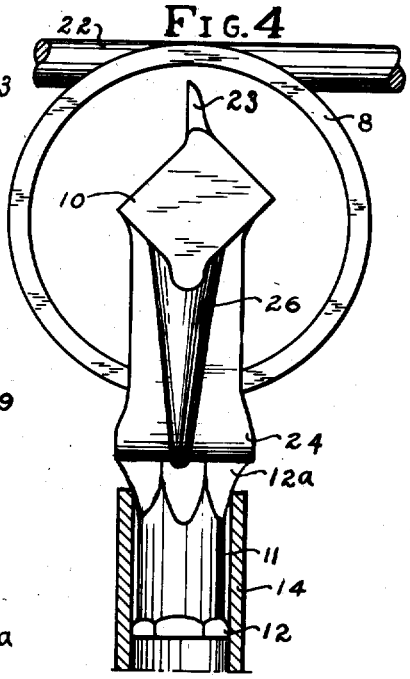
Fig. 4 is a side view, the upper end of the post being in section.
Figure 7:
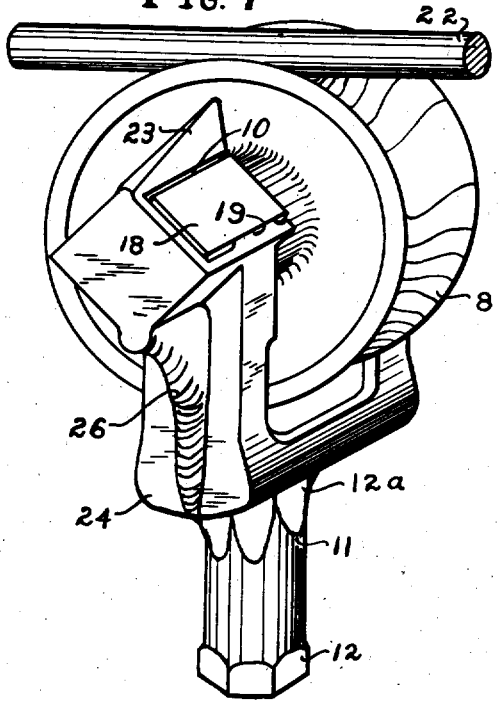
Fig. 7 is a perspective view of the idler assembly.
Figure 5:
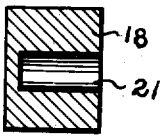
Fig. 5 is a sectional view of a bearing on the line 5—5 of Fig. 6.
Figure 6:
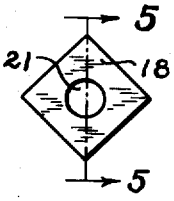
Fig. 6 is an end view of the bearing.
Figure 8:
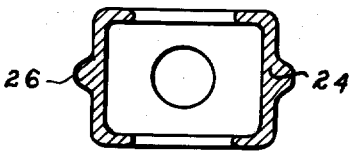
Fig. 8 is a transverse sectional view of the head on the line 8—8 of Fig. 1.

The head preferably consists of a casting embodying a fork 24 and shank 11. Boxes 10 are formed at the upper ends of the fork members. Extensions 23 surmount the boxes and their upper edges slope outwardly and downwardly to prevent lodging of the rod or transmission line 23 on the boxes when displaced from the pulley 8, thereby preventing injury to the head by reciprocation of the rod in contact therewith. The boxes 10 are approximately square and disposed with the diagonal axes vertically and horizontally, as shown most clearly in Fig. 3, presenting a diamond-shaped outline. The boxes are closed except at the inner and the top sides which are open to facilitate removal or insertion of the square bearings 18 therein. The lower inner corners of the boxes are cut away at 16, to insure aligning of the bearings 18 and to provide clearance for moisture, sand, or other foreign matter that may find its way into the boxes.

Hollow ribs 26 brace and strengthen the fork head 24 and boxes 10 and connect with the cut away portions 16 to carry off any matter tending to accumulate. A raised seat 19 is formed upon the inner face of each lower side of the boxes 10 to engage the bearings 18 and prevent any play thereof. This also results in clearance for the escape of any moisture, sand, or other foreign matter that may find its way into the boxes. The fork 24 is of channel formation for strength and lightness.

The bearings 18 are square and are of appreciably smaller transverse area than the area of the respective boxes, whereby said blocks are loose therein and capable of relative bodily movement up and down as well as from side to side for self-adjustment of the blocks to compensate for wear and may be of any preferred material, such as processed wood which resists wear and does not require frequent or excessive lubrication. The axle openings 21 are closed at their outer ends to exclude the entrance of moisture, sand, and other matter. The extensions 23 are located at the top and at the upper edges of the open sides of the boxes and serve as guides to facilitate the placing of the pulley 8 and bearings 18 in position.

The pulley 8 is grooved to receive the rod line 22 and is fast to the axle 13, being preferably cast thereon and prevented from displacement by projections 17 formed on the axle and embedded in the pulley. Plates or washers 9 at the sides of the pulley 8 close the outer ends of the axle openings 21 in the bearings 18, and sustain the lateral thrusts of the pulley.

Tubular posts 14 are positioned at intervals along the length of the rod line and receive idler heads and pulleys. The shank 11 of each idler head telescopes the post and is formed at its lower end with projections 12 and at its upper end adjacent the base of the fork with tapering projections 12*a* which wedgingly engage the upper end of the post to hold the head in place against any movement.

It is noted that the head is a one-piece structure and being of channel formation is light and strong. The extensions 23 function as guards and guides in the manner stated, besides bracing the boxes 10. The form of the boxes 10 results in preventing displacement of the bearings and pulley by reason of the inward and downward sloping of the lower sides, as best shown in Fig. 3.

I claim:

1. A rod line and guide comprising a forked head having fork members with substantially square boxes at the upper ends of the fork members and arranged with the diagonal axes in vertical and horizontal positions and the inner and an upper side of the boxes open and having the inner lower corners cut away, and having raised seats upon the inner faces of the lower sides and having hollow ribs connecting with the cut away corner portions, and having tapering projections adjacent the base of the fork to wedgingly engage a support to which the head is adapted to be fitted.

2. A rod line and guide comprising a forked head having fork members with substantially square boxes at the upper ends of said fork members and arranged with the diagonal axes thereof in vertical and horizontal positions, each box having an inner and an upper side thereof open and having raised seats on the inner faces of the lower sides thereof, and bearing blocks mounted in said boxes on the raised seats providing for drainage between the faces of the boxes and the blocks and through the open inner sides.

3. A rod line and guide comprising a forked head having fork members with substantially square boxes at the upper ends of said fork members and arranged with the diagonal axes thereof in vertical and horizontal positions, each box having an inner and an upper side thereof open and having raised seats on the inner faces of the lower sides thereof, bearing blocks mounted in said boxes and seated on the raised seats in spaced relation with the lower sides of the boxes providing for drainage between the faces of the boxes and the blocks and through the open inner sides, and a guide wheel journaled in said bearing blocks.

4. A rod line idler comprising a head having a pair of bearing boxes, each with V-shaped lower sides with an apex turned downward and having a closed outer end and an open upper side, and angular wooden bearing blocks loosely inserted in the bearing boxes with sides facing the V-shaped sides and a corner toward the apex and spaced therefrom for self-alignment in the boxes.

5. A rod line idler comprising a head having an upright shank and a pair of bearing boxes at the upper end thereof, each bearing box having V-shaped lower sides with an apex turned downward approximately in the vertical plane of the upright shank and having a closed outer end and an open upper side, and approximately square wooden bearing blocks loosely inserted in the bearing boxes with sides facing the V-shaped sides and a corner turned toward the apex and spaced therefrom for self-adjustment of the bearing boxes.

6. A rod line idler comprising a head having a pair of bearing boxes, each with approximately V-shaped lower sides with a recess at the lower apex thereof, bearing blocks having sides supported on the V-shaped lower sides of the bearing boxes with the lower edges of said blocks in the recesses for self-aligning of the blocks, and guiding means supported by said blocks.

7. A rod line idler comprising a head having a pair of bearing boxes, each with approximately V-shaped lower sides with a recess at the lower apex thereof, bearing blocks having sides supported on the V-shaped lower sides of the bearing boxes with the lower edges of said blocks in the recesses for self-aligning of the blocks, each of said blocks having bearings therein, and a rod line guide having a shaft journaled in said bearings.

8. A rod line idler comprising a head having an upright shank with a pair of bearing boxes at the upper end thereof, each bearing box having approximately V-shaped lower sides, approximately square wooden bearing blocks, means for supporting the blocks on the V-shaped lower sides with the lower edges of said blocks spaced from the adjacent portions of the head for self-alignment of the blocks, said blocks having bearings in the inner sides thereof, and a rotary rod line guide having journals supported in said bearings.

9. A rod line idler comprising a shank having a forked head at the upper end thereof, said head having laterally spaced bearing receptacles therein, each receptacle being unitary and rigid with an upper portion thereof open and with an open inner side, each receptacle having lower sides arranged obliquely and supporting a wooden angular bearing block, said block being of appreciably smaller transverse area than the receptacle and loose therein capable of bodily movement for self-adjustment relative to the receptacle, and a guide member having journals extending into the blocks in the receptacles and supported thereby.

DAVID ERICKSON.